April 5, 1955     K. E. A. GÖTHBERG ET AL     2,705,547
LUBRICATOR
Filed April 25, 1951     2 Sheets-Sheet 1
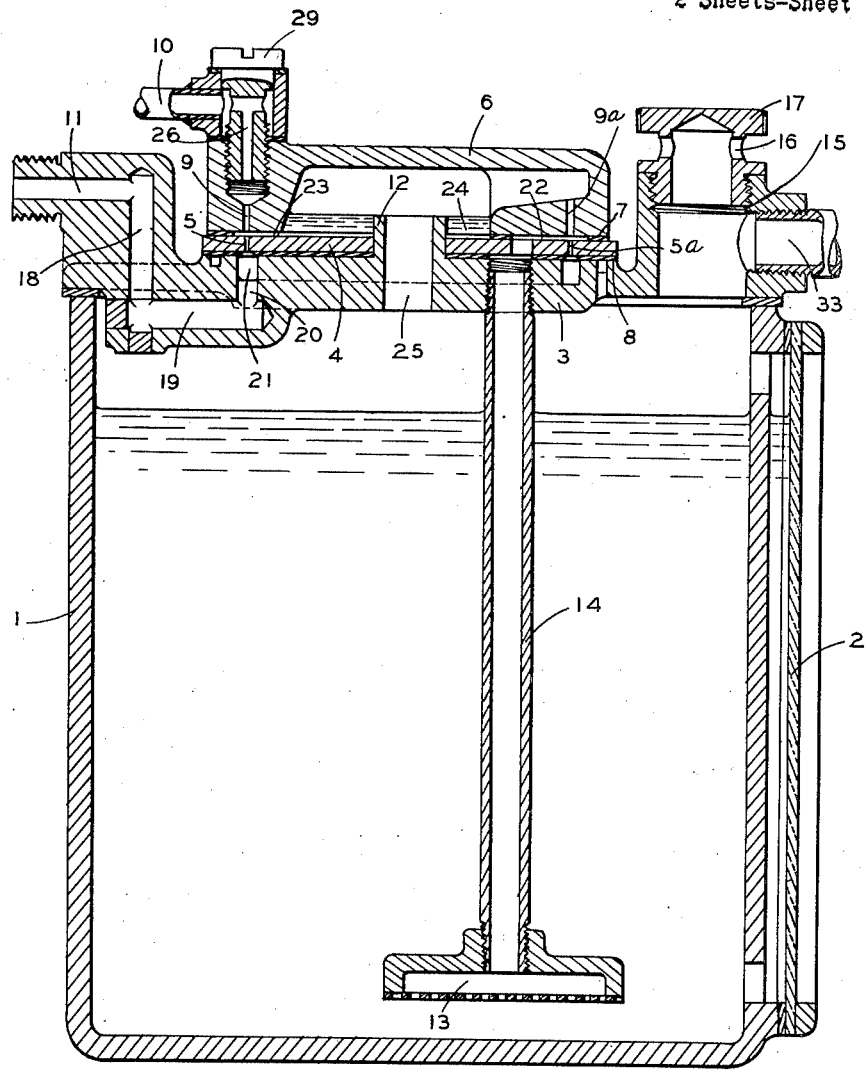
FIG. 1.
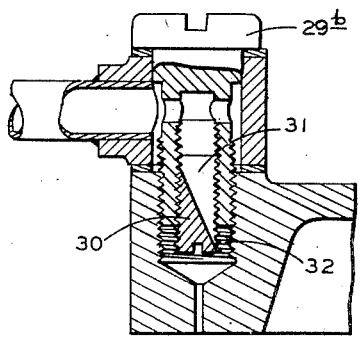
FIG. 3.
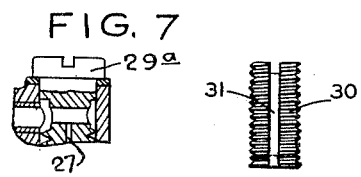
FIG. 7
FIG. 4.
INVENTORS
KARL EVALD ANDREAS GÖTHBERG
JOHN ERLING WILHELM STRANNE
Howson & Howson

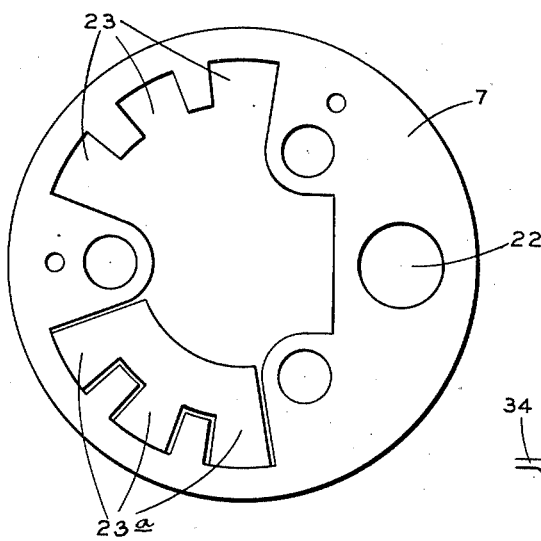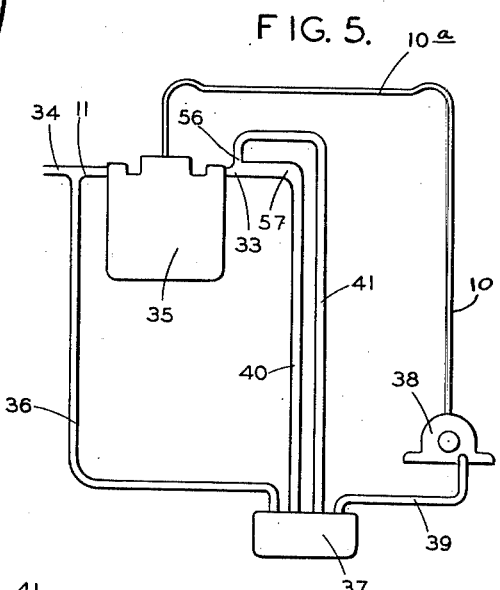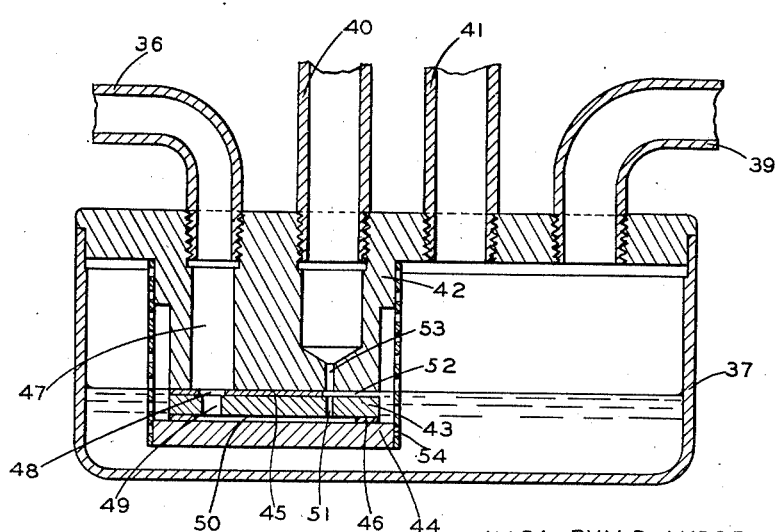

United States Patent Office 2,705,547
Patented Apr. 5, 1955

2,705,547

LUBRICATOR

Karl Evald Andreas Göthberg and John Erling Wilhelm Stranne, Goteborg, Sweden, assignors to Aktiebolaget Svenska Kullagerfabriken, Goteborg, Sweden, a corporation of Sweden Application April 25, 1951, Serial No. 222,808

Claims priority, application Sweden April 27, 1950

7 Claims. (Cl. 184—55)

The present invention relates to a lubricating system in which, as with the known oil mist lubricator, the oil is transported by air pressure through pipes to the various points of lubrication without the need of more or less complicated pumping devices and which when used for lubricating of rolling bearings will create a pressure in the bearing housing greater than that of the surrounding atmosphere to prevent impure air from entering the housing and destroying the bearing, but which can deliver lubricant in larger quantities than the oil mist lubricator without increasing the consumption of air and which also will permit of circulation of the lubricant, whereby the system will be still more economical than oil mist lubrication.

In the oil mist method the oil is transported through pipes in the form of small particles suspended in the air. It is clear that under these conditions only relatively small quantities of oil can be transported through a pipe per unit of time, unless very great quantities of air are used. According to the present invention the oil is transported in liquid form the whole distance from the lubricator to the parts to be lubricated, such as bearings, and the oil follows the bottom or the wall of the pipe, while the air flows along the centre of the pipe. This can be made to occur not only in downwardly directed pipes, but also in pipes directed horizontally or upwards if the flow of air is turbulent. Undulations are caused in the oil by the turbulent air stream. The undulations move in the direction of the air flow and cause the oil to flow along the pipe.

For air economy, pipes having up to about 8 mm. internal diameter are very suitable for use in the above described method of transporting oil through pipes. It is necessary to supply sufficient air to the pipe to cause the speed of flow to exceed a critical value for the air channel in the pipe, the walls of which are covered with a layer of oil whereby turbulence is created. If the internal diameter of the pipe does not exceed 8 mm. the air consumption will be comparatively low, not greater than with oil mist lubrication. On the other hand, the quantity of oil which the air can transport will be considerably greater, up to 100 times greater, than in oil mist lubrication.

The invention is illustrated in the accompanying drawings in which Fig. 1 shows a vertical section through a lubricating apparatus. Fig. 2 is a plan view of a packing. Fig. 3 is a section through a nipple having a regulating screw and Fig. 4 is another view of the screw. Fig. 5 shows a lubricating system which includes an oil return apparatus and Fig. 6 is a section through the oil return apparatus. Fig. 7 is a fragmentary sectional view illustrating a modification of the apparatus of Fig. 1.

The oil container 1 has a sight glass 2 for checking the oil level and a cover, which latter comprises three main parts, namely the cover proper 3, a flat round disc 4 with a number of fine holes 5 of a diameter of 0.5–1 mm. and a round cover or house 6. These three parts are separated by packings 7 and 8. Opposite the holes 5 in the disc 4 the house 6 is provided with holes 9 of somewhat greater diameter, usually 1 to 2 mm., and corresponding in number to the holes 5. One of these holes (9a, at the right hand side of the figure) opens into the interior of the house 6 while each of the others is in direct communication with one of a number of lubricant lines 10. Each aligned pair of openings 5 and 9, and the openings 5a and 9a, constitute a nozzle which functions as hereinafter described. The cover proper 3 is provided with an inlet duct 11 for connection to a source of air pressure, not shown, an overflow 12 having an opening 25 through which the house communicates with the oil reservoir 1, a suction pipe 14 having a filter 13 extending down into the reservoir and an opening 15 for filling the reservoir. This opening is provided with a cap 17 having venting holes 16. The apparatus can be connected to a return pipe 33 which conducts the oil from the points of lubrication back to the reservoir.

The air, which should have a pressure of about 0.1–0.5 kg./cm.$^2$ above atmospheric pressure is led into the cover through the duct 11 which communicates with an annular channel 21 through channels 18, 19 and 20. From the channel 21 the air flows through the fine holes 5 in the disc 4, where its speed is very great, into the somewhat larger holes 9 in the house 6. The packing 7 between the disc 4 and the house, as shown in Fig. 2, has a round opening 22 through which one (5a) of the fine holes 5 is in communication with the suction pipe 14 and a number of radial slots 23 which provide access from the interior of the house 6 to the air jets in the other holes 5.

The pressure around the air jet where it leaves the hole 5a in the disc 4 will normally be somewhat under the static pressure at that point. As a result hereof oil is drawn from the reservoir 1 up through the suction pipe 14 to the jet through the hole 5a after which the oil together with the air passing through the hole 5a continues through the hole 9a into the house 6. The house is thus filled with oil up to the upper edge of the overflow 12 and forms a bath 24 of constant depth. The air returns through a hole 25 in the cover and leaves the apparatus through the vents 16 in the cap 17. The oil in the bath 24 has access to the holes 9 through the slots 23 in the packing and is carried along into the pipes by the stream of air flowing from the holes 5. The lubricating lines usually comprise pipes having 3 to 4 mm. internal diameter. These dimensions are also suitable because the pipes may be easily drawn in the required direction.

The quantity of oil which each air jet can convey depends on the subpressure which it creates and this subpressure depends in its turn on the resistance which the jet must overcome on its way. If the resistance is increased the subpressure at the outlet of the jet from the disc will be less and a smaller quantity of oil will be caught by the jet. The right hand jet at 9a is counteracted only by the pressure in the house 6 which is very inconsiderable. The capacity of the jet in grams of oil per hour is therefore relatively great. The other jets on the other hand must overcome the much greater counter-pressure in the lubricating lines 10 and each of them will thus convey only a fraction of the quantity of oil which the first mentioned jet pumps into the house.

Due to this reciprocal action between the resistance and the subpressure the quantity of oil in the lines will be practically constant. If too much oil enters one of the lines for any reason the back pressure in this line will increase with the result that the subpressure at the outlet of the jet from the disc will be filled out and may even rise slightly above atmospheric. This will be apparent, since bubbles of air then leak out through the oil channel 23. In both cases the change in pressure will cause the flow of oil to the jet to cease. The greater part of the air continues, however, to flow through the line and to convey oil with it. After a few seconds the layer of oil in the line has become so much thinner and thus the resistance to the flow so much decreased that the pressure around the air jet is again slightly negative and oil is again pumped into the line.

In order that the quantity of oil transported through the line per unit of time may be constant it is necessary that in addition to certain normal conditions, for instance that the jet is constant and that the viscosity of the oil does not change, that the static oil pressure at the point at which the air leaves the disc 4 is constant. The apparatus shown meets this requirement since the level of the liquid in the house is kept constant through the overflow 12.

The channels through which the oil flows to the respective air jets are formed, as previously stated, by slots 23 in the packing 7, which is comparatively thin, namel 0.1–1 mm. This has the advantage that the open way of the jet between the hole in the disc 4 and the house 6 will be very short, thus increasing its suction. Since the slot extends around the jet the oil reaches the jet from all sides. The supply of oil to the jet is therefore not disturbed if, for example, at times bubbles leave the jet and escape backwards through the slot into the house. The packing shown in Fig. 2 is intended for use with a lubricating apparatus having six lubricating lines. The slots 23 in the packing radiate from the central chamber of the house and communicate with each other only through this chamber. By filling certain of the slots with patches 23a of packing as shown in the figure both air and oil are prevented from escaping through the respective slots. This measure is used when some of the outlets from the apparatus are not to be used. Certain lines may, however, be closed provisionally in other ways for instance by cocks or the like. The air then leaves through the slot, the overflow hole 25 and the vents 16 in the cap 17. The lines which are in use are not disturbed hereby, but this method causes an unnecessary consumption of air as compared to the first mentioned.

Each outlet has its own separate nozzle and it is thus possible to regulate the quantity of oil per unit of time which is delivered by a lubricant line without affecting the quantity of oil in the other lines. This can be accomplished by introducing an extra resistance at the beginning of the line, for instance a constriction. This should have a flow area less than that of the line itself but greater than the least area of the nozzle. Figs. 1 and 7 illustrate comparatively at 26 and 27 respectively how the desired extra resistance can be obtained by varying the area of flow in the nipples 29 and 29a. Figs. 3 and 4 however, show a more convenient device. The nipple 29b is provided with a screw 30 with a longitudinal groove 31. The depth of the groove is zero at one end of the screw and equal to the diameter of the screw at the other end. The opening 32 which the groove leaves for the air jet is increased as the screw is screwed downwards. By this means it is possible to regulate the resistance to the flow of air as desired.

From the above it is apparent how the oil quantity per unit of time in each lubricant line may be regulated. By raising or lowering the pressure of the air the quantity of oil in all of the lines may be increased or decreased simultaneously. The quantity of oil per unit of time has been found to be directly in proportion to the pressure above atmospheric pressure. As before mentioned the air pressure may be varied between 0.1 and 0.5 kg./cm.$^2$ above atmospheric. Greater pressures may also be used, but in this case small quantities of oil mist will be formed where the oil meets the air jet. This oil mist in no way impairs the functioning of the apparatus, but causes the air surrounding the apparatus to become somewhat mingled with oil.

If a lubricant line has been completely emptied of oil and the apparatus is started, a comparatively heavy pumping action will take place at the beginning until a layer of oil has been built up in the line and the resistance thus reaches normal. Thus the time required to cover the pipe internally with oil and reach the state at which the oil is transported is shortened. When lines of more than 1 m. in length are used, however, it is advisable to provide oil pockets in the line by forming small loops in the line as illustrated in Fig. 5 at the point 10a. Oil is collected in these pockets when the apparatus is stopped. When the system is again started, the oil layer in the pipe is built up from several points simultaneously which shortens the starting time.

Oil many be added while the apparatus is in use.

Since the pressure in the reservoir is no higher than that at the points of lubrication it is possible to cause the oil to circulate so that the oil is returned to the reservoir from the latter. The oil will be returned by gravity to the container from points of lubrication which are higher than the apparatus. The invention is however applicable to a simple return apparatus which lifts the oil to the reservoir from points of lubrication which are lower than the lubricator (main apparatus).

Fig. 5 shows diagrammatically a lubricating system comprising both a lubricator 35 and an oil return apparatus 37 for returning the oil to the lubricator from a bearing 38 which is located at a lower level than the lubricator. Both apparatuses are connected to the same air pressure line 34, the lubricator through a pipe 11 and the return apparatus through a pipe 36. The lubricant line 10 connects the lubricator with the bearing 38. A pipe 39 leads from the bearing to the return apparatus, which is located somewhat lower than the bearing. The oil which flows to the return apparatus through the pipe 39 is pumped in the manner described below through pipes 40, 57 and 33 back to the reservoir of the lubricator.

Fig. 6 shows a section through the return apparatus. In a reservoir 37 is a pump device comprising three parts 42, 43 and 44 separated by packings 45 and 46. The air pressure line 36 and an oil line 40 are connected to the member 42. Air from the line 36 passes through channels 47, 48, 49, 50 and 51 in parts 42 and 43 and in the packings 45 and 46 and continues through an opening 52 in the packing 45 and a hole 53 in the member 42 to the pipe 40. The holes 51 and 53 correspond to the holes 5 and 5a and 9 an 9a respectively in Fig. 1. Through the flow of air a vacuum is created in the opening 52, which is in communication with the oil reservoir. The oil therefore flows to the jet and is caught by it and continues up through the pipes 40, 57 and 33. On its way from the reservoir proper in the return apparatus to the opening 52 it passes a filter 54 which separates any foreign particles which may be present.

A pipe 41 which is shown in Figs. 5 and 6 connects the air chamber of the lubricator with the reservoir of the return apparatus in order to transmit air from one to the other, if required to equalize the pressure.

If the return apparatus, the pumping capacity of which has been purposely made greater than the quantity of oil per unit of time which can enter it through the pipe 39, is temporarily empty of oil, air will be sucked into the opening 52 and will follow the stream of air through the pipe 40. The quantity of air which is thus pumped from the return apparatus to the lubricator may be so great that a vacuum might be caused in the return apparatus unless steps are taken to replace the air pumped out. The return apparatus is made entirely closed to keep out impurities from the surroundings and a vacuum in the return apparatus would thus cause a flow to the apparatus from the bearing 38 so that the desired higher pressure would not be maintained in the bearing housing.

If, however, as shown in Fig. 5 the point 56 of the horizontal pipe 57 is connected by a pipe 41 with the return apparatus the air, which may have been sucked out of the return apparatus, is forced back to the apparatus. The oil which is pumped up through the pipe 40 will through gravity follow the bottom of the horizontal pipe 57, the inner diameter of which is suitably made somewhat greater than that of the other pipes. It then continues through the pipe 33 to the lubricator 35. The connecting point 56 of the pipe 41 is preferably located at the upper side of the horizontal pipe 57. It should in all cases be located higher than the bottom of the pipe 57.

Instead of connecting the pipe 41 to a point on the line 40, 57, 33 as shown in Fig. 5, it may be connected to a separate connection in the cover of the lubricator.

We claim:

1. In a lubricator for use in a lubricating system in which liquid lubricant is transported to one or more points of lubrication by air pressure, a lubricant container comprising a main oil reservoir and a small reservoir disposed above said main reservoir, a pair of nozzles each having a relatively constricted inlet connected to a source of air pressure and an outlet of greater cross sectional area than the inlet and located in line with said inlet, a first of said nozzles having its outlet in communication with the smaller reservoir and being operatively connected with the main reservoir for transfer of oil from the latter to the smaller reservoir by said air pressure, and the second of said nozzles being operatively connected with the smaller reservoir and having its outlet connected to a duct for transfer by said air pressure of oil from the said smaller reservoir to a remote point of lubrication, said duct being of small internal diameter so as to afford transfer of lubricant by the air stream in liquid form irrespective of the direction of the duct.

2. A lubricator according to claim 1 including a plurality of nozzles operatively connected with the smaller reservoir and each having its outlet connected to an independent duct for transfer of oil to an individual point of lubrication.

3. A lubricator according to claim 1 wherein the upper oil reservoir is provided with an overflow to the lower reservoir.

4. A lubricator according to claim 1 including means for constricting the said duct, the cross sectional area of the restriction being greater than the least cross sectional area of the nozzle.

5. A lubricator according to claim 4 wherein the constricting means comprises a nipple threaded into the duct, said nipple having means for varying the effective cross sectional area of its bore.

6. A lubricator according to claim 5 wherein the nipple is internally threaded for reception of a regulating screw, said screw having a longitudinal groove in the side thereof providing a passage for oil between the screw and the confronting wall of the nipple, the effective area of said passage being varied by adjustment of the screw in the nipple.

7. A lubricator according to claim 1 wherein the lubricant ducts are provided with oil pockets.

References Cited in the file of this patent

UNITED STATES PATENTS

| | | |
|---|---|---|
| 1,198,173 | Wakefield | Sept. 12, 1916 |
| 1,893,040 | Schmidt | Jan. 3, 1933 |
| 2,367,721 | Gothberg | Jan. 23, 1945 |
| 2,417,403 | Zonis | Mar. 11, 1947 |
| 2,531,411 | Davenport | Nov. 28, 1950 |

FOREIGN PATENTS

| | | |
|---|---|---|
| 28,293 | Great Britain | Pat. of 1908 |
| 105,560 | Switzerland | July 1, 1924 |